United States Patent [19]

Oide et al.

[11] Patent Number: 5,052,116

[45] Date of Patent: Oct. 1, 1991

[54] METHOD AND APPARATUS FOR MEASURING AZIMUTH

[75] Inventors: Sakuji Oide, Minamiuonuma; Ryoichi Nakajima, Ojiya, both of Japan

[73] Assignee: Alps Electric Co., Ltd., Tokyo, Japan

[21] Appl. No.: 486,627

[22] Filed: Feb. 28, 1990

Related U.S. Application Data

[63] Continuation-in-part of Ser. No. 263,658, Oct. 27, 1988, abandoned.

[30] Foreign Application Priority Data

Feb. 23, 1988 [JP] Japan .................. 63-40487

[51] Int. Cl.⁵ .......................... G01C 17/28
[52] U.S. Cl. ..................... 33/361; 324/254; 324/247
[58] Field of Search .................. 33/361, 362, 356; 324/247, 253, 254, 255

[56] References Cited

U.S. PATENT DOCUMENTS

| | | | |
|---|---|---|---|
| 3,862,499 | 1/1975 | Isham et al. | 33/302 |
| 3,942,258 | 3/1976 | Stucki et al. | 33/361 |
| 4,095,348 | 6/1978 | Kramer | 33/363 K |
| 4,157,619 | 6/1979 | Zuvela | 33/361 |
| 4,174,577 | 11/1979 | Lewis | 33/362 |
| 4,262,427 | 4/1981 | Lynch et al. | 33/361 |
| 4,399,615 | 8/1983 | Matsumoto et al. | 324/254 |
| 4,480,226 | 10/1984 | Kuno et al. | 324/247 |
| 4,495,467 | 1/1985 | Kuno et al. | 324/247 |
| 4,622,754 | 11/1986 | Chujo et al. | 33/361 |
| 4,673,878 | 6/1987 | Tsushima et al. | 33/361 |
| 4,673,913 | 6/1987 | Akita et al. | 33/361 |
| 4,677,381 | 6/1987 | Geerlings | 33/361 |
| 4,677,754 | 7/1987 | Hormel | 33/361 |
| 4,680,866 | 7/1987 | Johnson | 33/361 |
| 4,694,583 | 9/1987 | Blaney | 33/361 |
| 4,698,912 | 10/1987 | Fowler et al. | 33/361 |
| 4,751,783 | 6/1988 | Ina et al. | 324/254 |
| 4,763,072 | 8/1988 | Katoh et al. | 324/253 |
| 4,771,547 | 9/1988 | Akutsu et al. | 33/361 |
| 4,812,812 | 3/1989 | Flowerdew et al. | 324/247 |

Primary Examiner—William A. Cuchlinski, Jr.
Assistant Examiner—Diego F. F. Gutierrez
Attorney, Agent, or Firm—Guy W. Shoup; B. Noel Kivlin

[57] ABSTRACT

A method of measuring an azimuth by detecting the earth's magnetism by using two perpendicular coils to detect the azimuth according to the outputs of the coils, including the steps of converting the outputs of the coils by multiplying them by a constant so as to vary in a range determined by a reference value, dividing the converted signal by the reference value, and measuring the azimuth at each coil output according to an inverse trigonometric function, with the divided result as a variable. An azimuth measuring apparatus for executing the method is also provided. Thus, the method and apparatus can accurately detect the azimuth and can further detect an error due to a disorder of the earth's magnetism or the inclination of the apparatus.

3 Claims, 11 Drawing Sheets (0°)

(90°)

(180°)

(270°)

METHOD AND APPARATUS FOR MEASURING AZIMUTH

CROSS REFERENCE TO RELATED APPLICATION

This is a continuation in part of U.S. Pat. Application Ser. No. 07/263,658 filed Oct. 27, 1988, now abandoned.

BACKGROUND OF THE INVENTION

1. Field of the Invention

This invention relates to an azimuth measuring apparatus for detecting an azimuth by means of earth magnetism and, more particularly, to a method for measuring an azimuth and an apparatus for measuring the azimuth which can accurately correct the detected azimuth.

2. Description of the Prior Art

An azimuth detector ior detecting an azimuth by means of earth magnetism is used, for example, in a navigation system carried on a vehicle.

This azimuth detector generally employs a flux gate sensor (i.e., "FGS") which outputs a signal corresponding to earth magnetism detected by two perpendicular coils. The azimuth is detected by combining the outputs of the coils.

A principle of detecting an azimuth will be described as follows. One of the coils first outputs a signal NS representing a north-to-south direction, and the other outputs a signal EW representing an east-to-west. When these output signals are combined by vectors, the trajectory of the end of the composite vector becomes a circle as designated in FIG. 10 when the measurements are ideally conducted. As shown in FIG. 10, the azimuth is obtained by the following equation.

$$\theta = \tan^{-1}((EW\ output)/(NS\ output))$$

where $\theta$ indicates the angle from a magnetic north.

However, the above-described conventional azimuth measuring apparatus has the disadvantages that the trajectory of the composite vector does not become a true circle due to the error of the flux gate sensor and because the reliability of the measured azimuth is low.

For example, the NS signal becomes maximum or minimum and the EW signal becomes minimum or maximum in the vicinities of 0°, 90°, 180° and 270°. In this case, when the signal is converted to an angle near the maximum value according to an inverse trigonometric function, the error increases. Accordingly, when both the signals are combined, it is difficult to enhance the accuracy.

In the conventional apparatus, when the flux gate sensor is inclined or the earth magnetism is disordered, the apparatus has a further disadvantage that it cannot detect these conditions as an error.

SUMMARY OF THE INVENTION

Accordingly, an object of this invention is to provide a method and an apparatus for detecting an azimuth which can eliminate the above-described disadvantages of the prior art and which can accurately detect an azimuth and can further detect an error due to a disorder of the earth magnetism or the inclination of a sensor as an error.

In order to achieve the above and other objects of the invention, there is provided according to the present invention a method of measuring an azimuth for detecting earth magnetism by two perpendicular coils to detect the azimuth according to the outputs of the coils, comprising the steps of converting the outputs of the coils by multiplying them by a constant which varies in a range of a reference value, dividing the converted signal by the reference value, and measuring the azimuth at each coil output according to an inverse trigonometric function with the divided result as a variable.

In the method, when the azimuths obtained according to the outputs of the coils are different, the angular difference is divided in proportion by weighting the azimuths in response to the output ratio of both the coils, thereby weighting the azimuths to obtain a true azimuth.

Further, in the method, whether the phase relationship of the outputs of the coils is normal or not is judged, and the correction of the angle corresponding to the displacement of the pahse angle is provided for the output of one coil when the phase relationship is not normal.

In order to further achieve the above and other objects of the invention, there is also provided according to the present invention an azimuth measuring apparatus comprising two perpendicular coils for detecting earth magnetism, conversion means for converting the outputs of the coils by multiplying them by a constant which varies in a range of a reference value, and measuring means for measuring the azimuth at the output of each coil by dividing the coil output converted by the conversion means by the reference value, according to an inverse trigonometric function, with the divided result as a variable.

The above-mentioned inverse trigonometric function is converted to an angle to be measured or a value relative to the angle. Since the azimuths are individually measured from the respective coils, the measured results can be compared. Further, the measured results can be accurately compensated according to the result of the comparison.

A principle of detecting the azimuth according to the present invention will now be described. As shown in FIGS. 2(a) to 2(d), two perpendicular coils NS.C and EW.C (e.g., flux gate sensors) are rotated by one revolution horizontally at an equal speed. Here, the coil NS.C measures the north-to-south direction, and the coil EW.C measures the east-to-west direction. When the coils NS.C and EW.C are rotated by one revolution at an equal speed as described above, each coil ideally produces a sine waveform (cosine waveform) as shown in FIG. 1(a). Here, the waveform designated by a broken line is the output signal NS of the coil NS.C, and the waveform designated by a solid line is the output signal EW of the coil EW.C. In this case, as shown in FIG. 1(a) each output signal level is multiplied by a constant to obtain a signal which varies in a range of the value $\pm A$. As shown in FIG. 1(b), the reference value A is taken from a crossing point 0 of perpendicular direction lines (north-to-sourth and east-to-west) to the north side, and the end is designated by a. Then, the length of a line OB is set to the value of the signal NS, and the position of a point B is so determined that the angle OBa becomes a right angle. When the coil NS.C rotates from the position designated in FIG. 2(a) at 0° to 90° with respect to the magnetic north under the above-mentioned condition with respect to the point B, the point B becomes a vertex of an angle of circumference or inscribed angle with a diameter as a chord, and its trajectory becomes a semicircle as designated by a broken line in FIG. 1(b). Since the signal NS is a sine wave (cosine wave), it is understood that the angle BOa is equal to a direction s of the perpendicular coils with respect to magnetic north. Then, since the values of the reference value A and the signal NS are known, the $\theta$ can be obtained from these values. For example, $\theta$ can be obtained by the following equation.

$$\theta = |\sin^{-1}((NS)/A) - 90°| = |\cos^{-1}((NS)/A)| \quad (1)$$

When the output signal EW of the coil EW.C is similarly processed, the azimuth 0 can be obtained, for example, by the following equation and as illustrated in FIG. 1(c).

$$\theta = |\cos^{-1}((EW)/A) - 90°| = |\sin^{-1}((EW)/A)| \quad (2)$$

The foregoing description is the principle of measuring the azimuth according to the present invention. The quadrant of the azimuth is determined by the symbols NS and EW as designated in FIGS. 3(a), 3(b), 3(c) and 3(d). In FIG. 3, broken lines designate the signal NS, and solid lines designate the signal EW.

As described above, according to the present invention, the azimuths are measured individually from the coils NS.C and EW.C.

Further, according to the present invention, the azimuth is obtained by the two coils and a processor is utilized to compare the measured results, thereby correcting the measured azimuth by the compared result. If the compared result deviates substantially from the measured result, it is judged as an error.

The principle of the present invention is as described above.

The above and other related objects and features of the invention will be apparent from a reading of the following description of the disclosure and found in the accompanying drawings and the novelty thereof pointed out in the appended claims.

DETAILED DESCRIPTION OF THE INVENTION

Figure 1A:
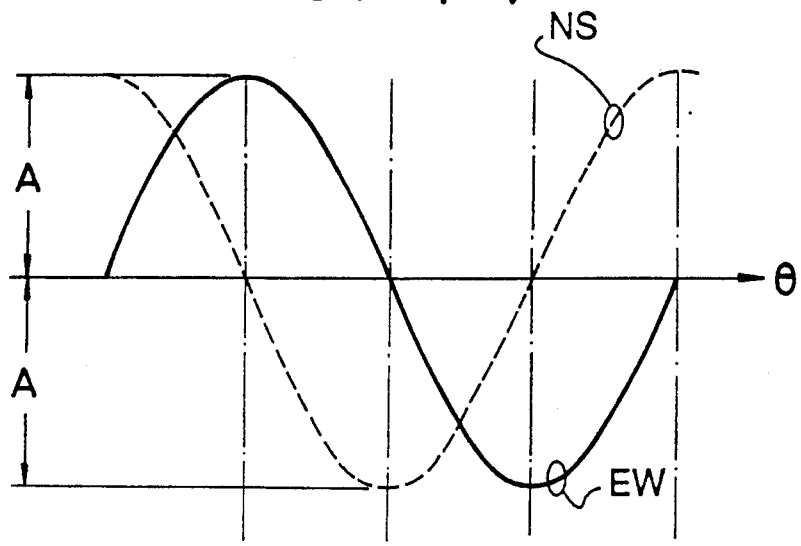
FIG. 1 is a view showing the principle of the present invention.
Figure 1B:
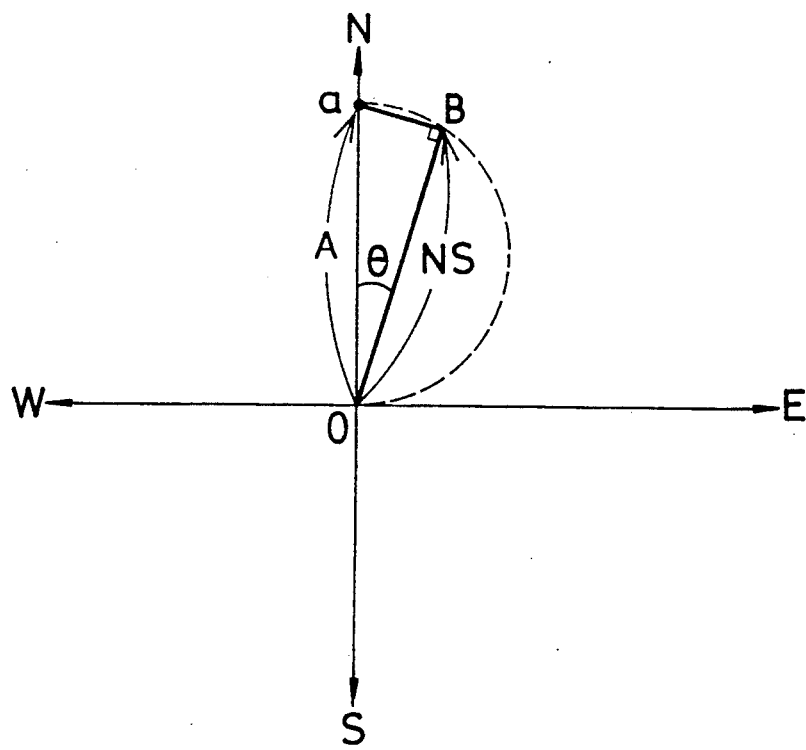
Figure 1C:
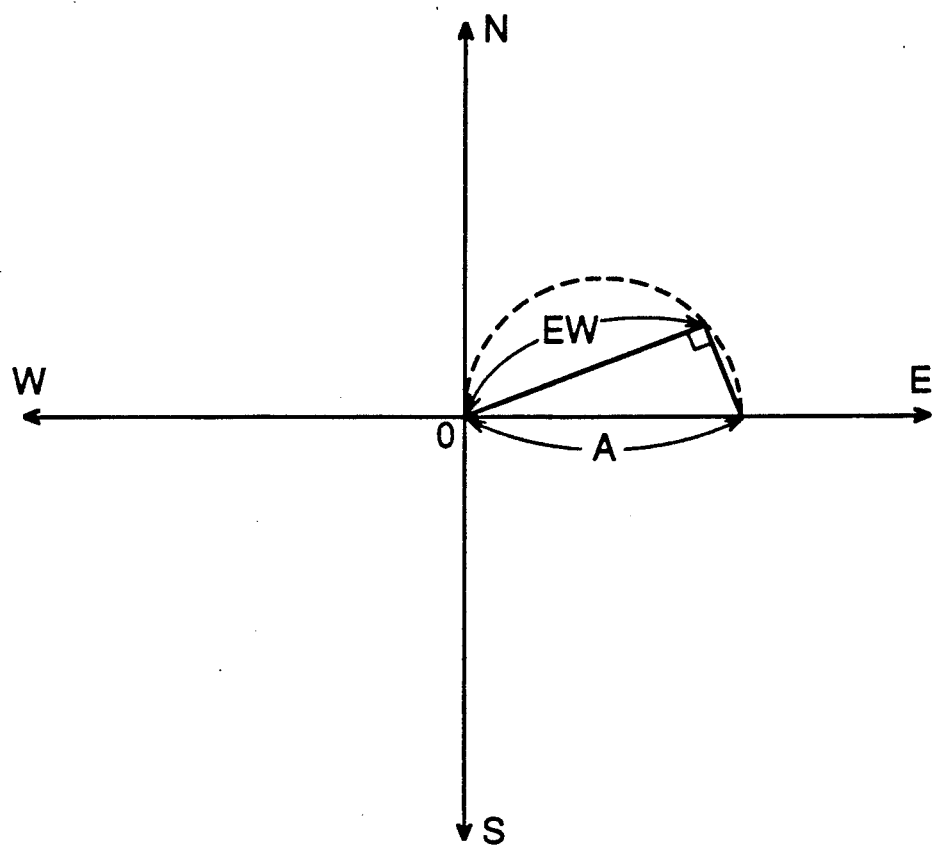
Figure 2A:
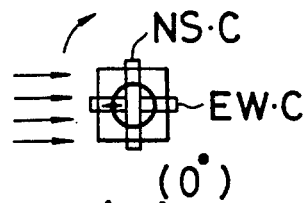
FIGS. 2a-2d are plan views showing the relationships between the rotation of a flux gate sensor and earth magnetism.
Figure 2B:
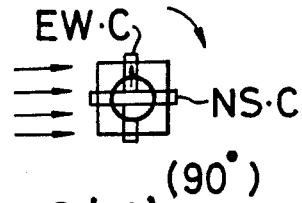
Figure 2C:
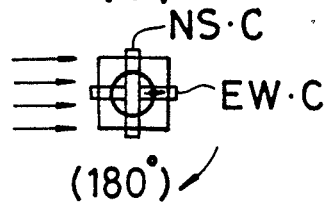
Figure 2D:
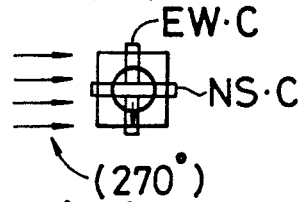
Figure 3A:
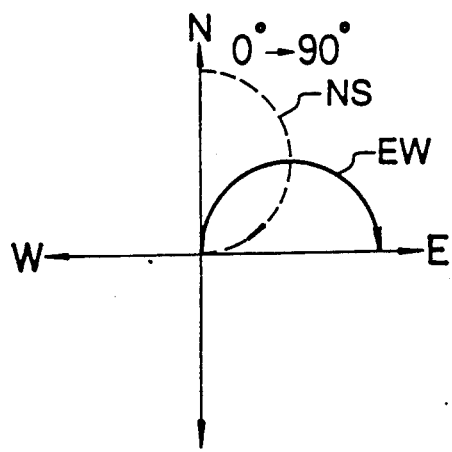
FIGS. 3a-3d are views showing the trajectories of a point representing an azimuth according to the present invention.
Figure 3B:
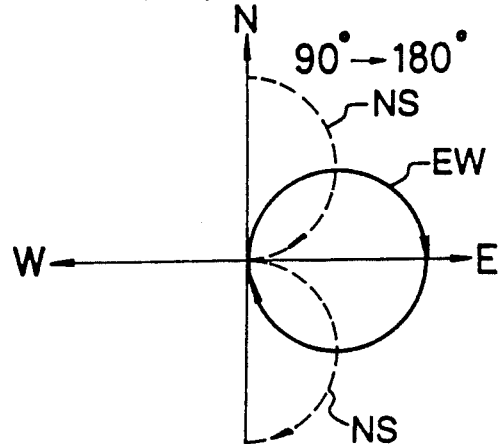
Figure 3C:
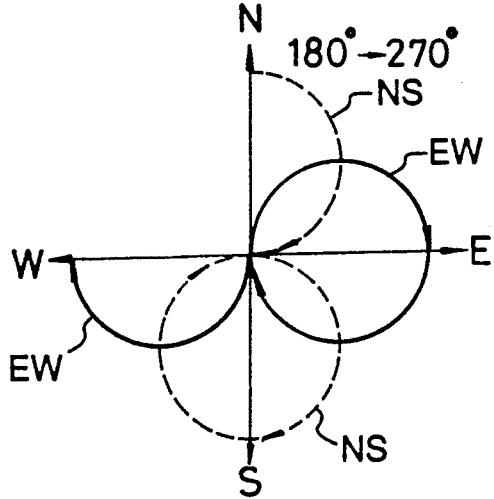
Figure 3D:
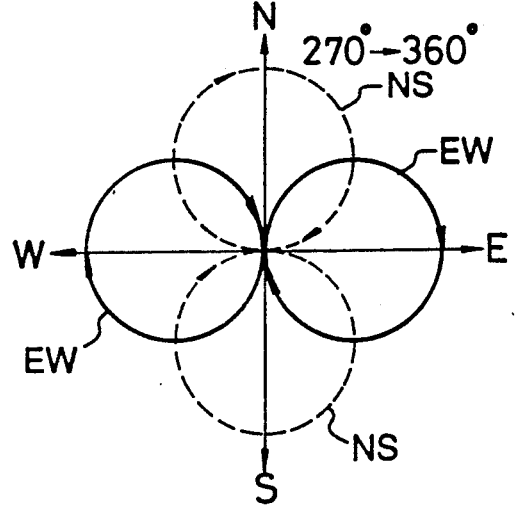
Figure 4:
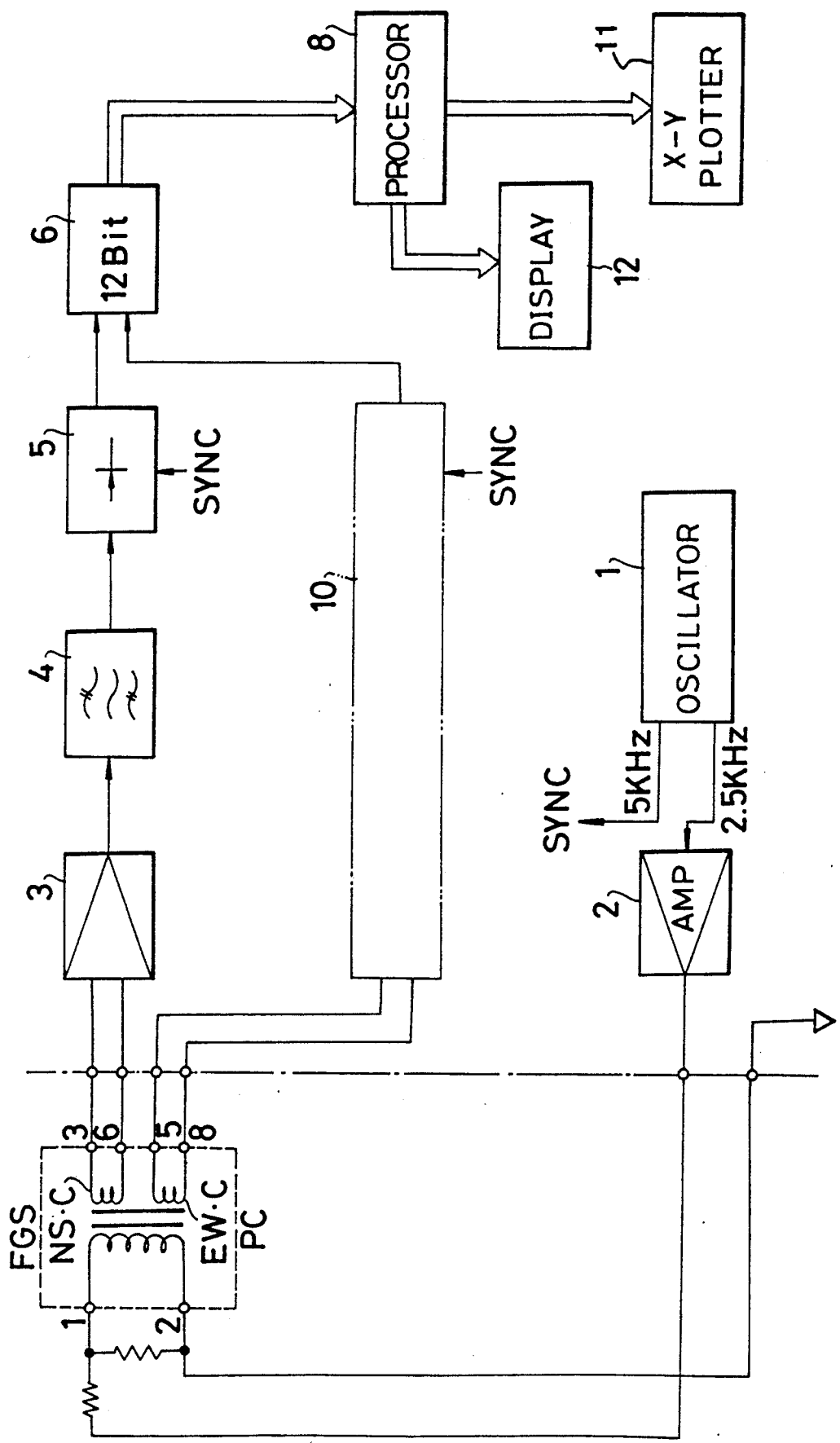
FIG. 4 is a block diagram showing the arrangement of an embodiment of the present invention.

An embodiment of the present invention will be described in detail with reference to the accompanying drawings FIG. 4 is a block diagram showing the entire arrangement of an embodiment of the present invention, wherein the reference numerals and symbols which are the same as those in FIGS. 2a-2d designate the same or equivalent components, and the description thereof will be omitted.

In FIG. 4, symbol FGS denotes a flux gate sensor, and symbol PC denotes its primary coil. A rectangular wave of 2.5 KHz is supplied from an oscillator 1 through an amplifier 2 to the primary coil PC.

The output signal of the coil NS.C is supplied through a preamplifier 3 to a bandpass filter 4, which removes any unnecessary noise component from the signal, and supplies the signal to a synchronous detector 5. The synchronous detector 5 detects the signal in synchronization with the rectangular wave of 5 KHz generated from the oscillator 1. The detected signal is converted by an A/D converter 6 to a digital signal, and then supplied to a processor 8. On the other hand, the output signal of the coil EW.C is synchronously detected by a circuit 10 entirely similar to amplifier 3, bandpass filter 4 and the synchronous detector 5 described above, and supplied through the A/D converter 6 to the processor 8.

Figure 9:
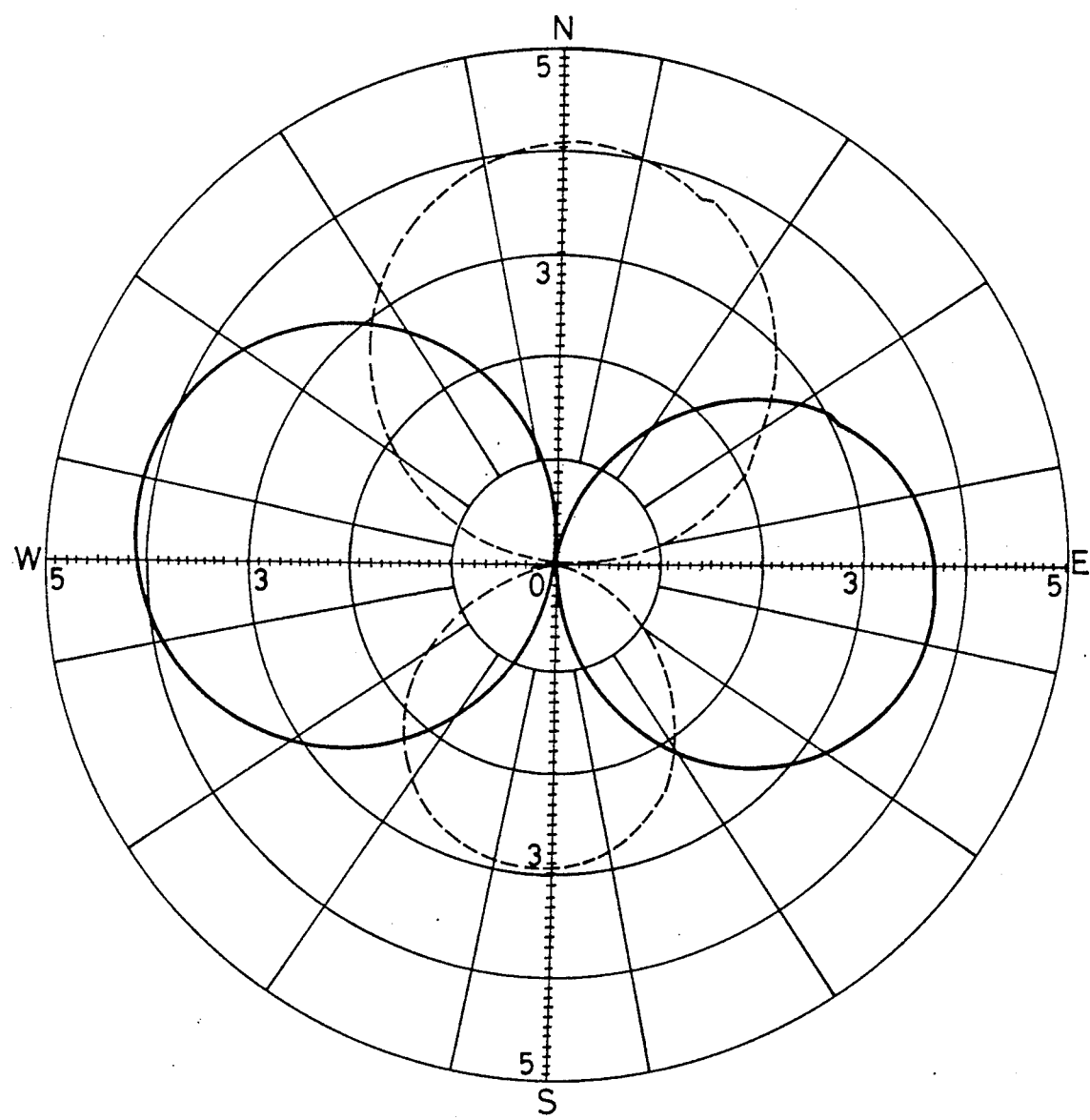
FIG. 9 is a characteristic diagram of the flux gate sensor used in the embodiment of FIG. 4.
Figure 10:
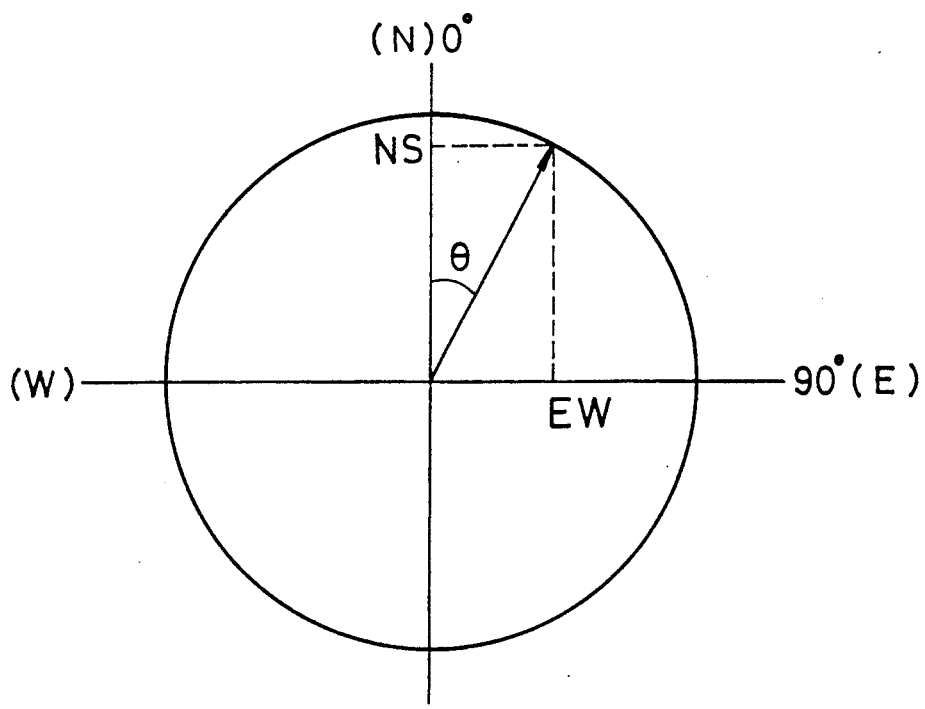
FIG. 10 is a vector diagram for explaining a conventional azimuth measuring method.

The processor 8 includes a microcomputer and its peripheral circuitry to measure the azimuth by a process described later. The processor 8 supplies a measured result to an X-Y plotter 11. Numeral 12 denotes a display unit for displaying various signals, such as a CRT display unit. The output characteristics of the coils NS.C and EW.S of the flux gate sensor FGS are shown in FIG. 9 for reference.

The process of the embodiment according to the arrangement described above will be described with reference to FIGS. 5(a), 5(b) to 8.

The operation of the embodiment includes a measuring operation for actually measuring an azimuth, and an operation for setting various correction values for accurately measuring the azimuth. The operation of setting a correction value will be first described.

Figure 5A:
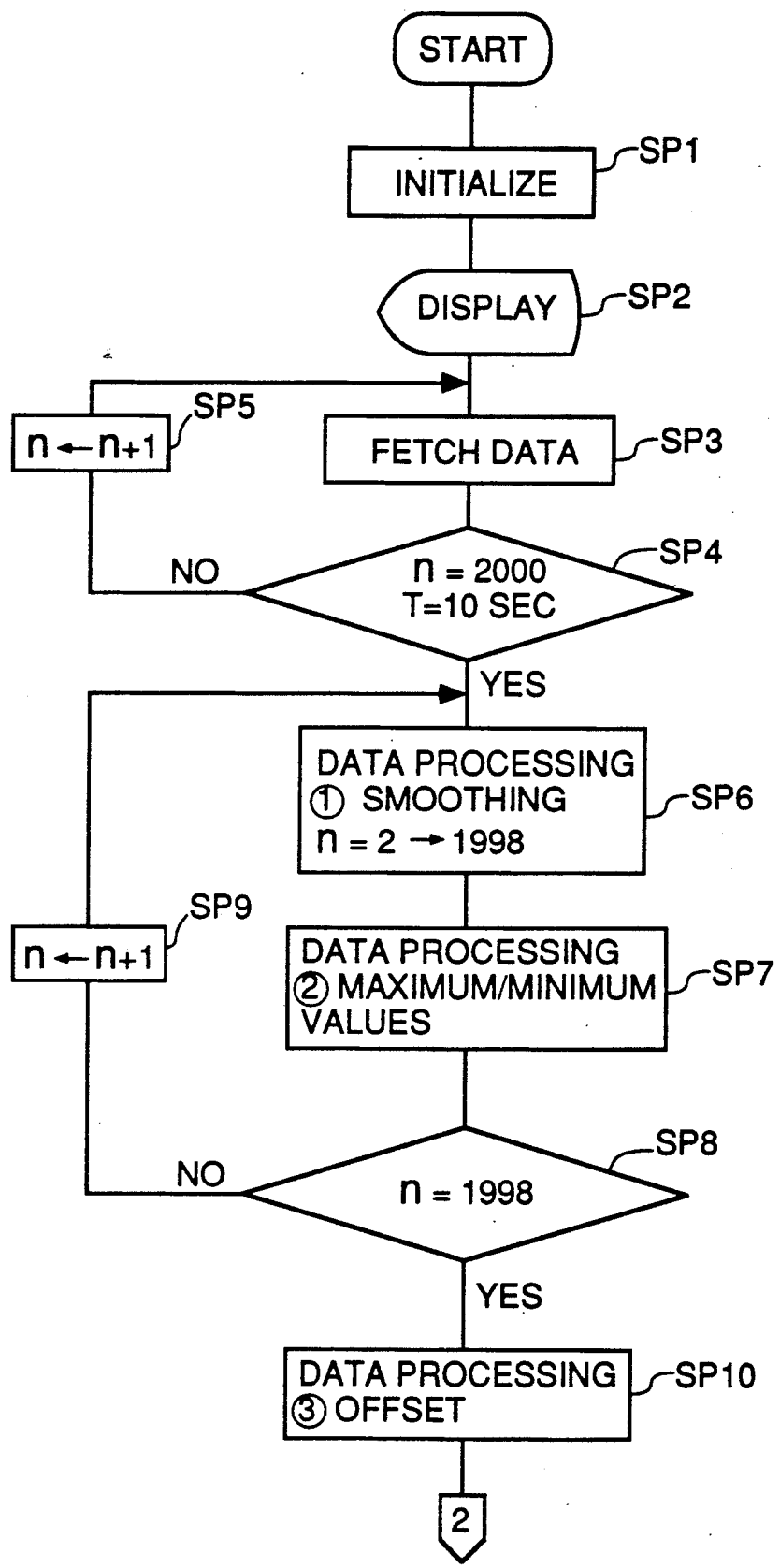
FIGS. 5(a) and 5(b) are flow charts showing the operation of the embodiment of FIG. 4.
Figure 5B:
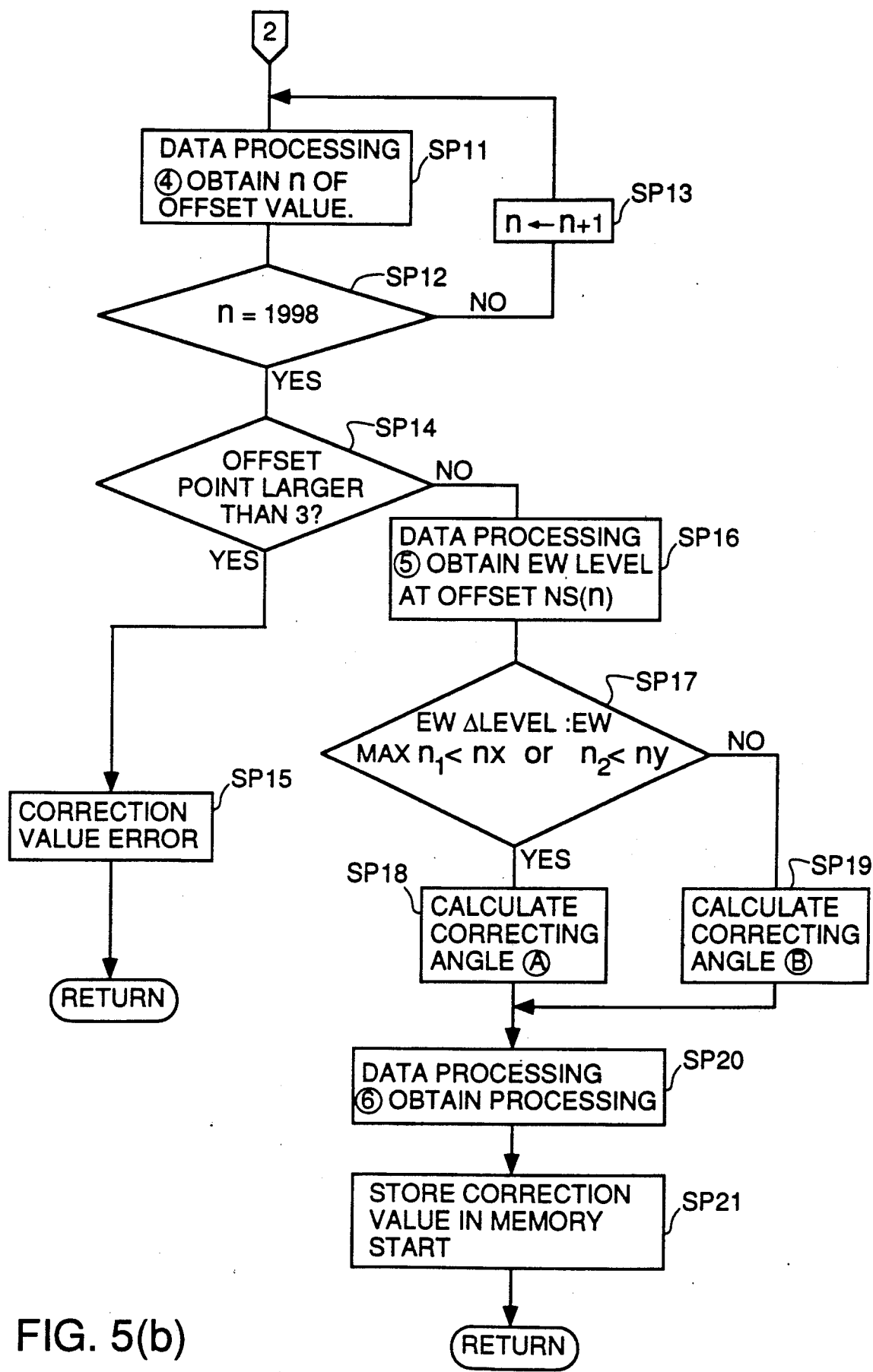
Figure 6A:
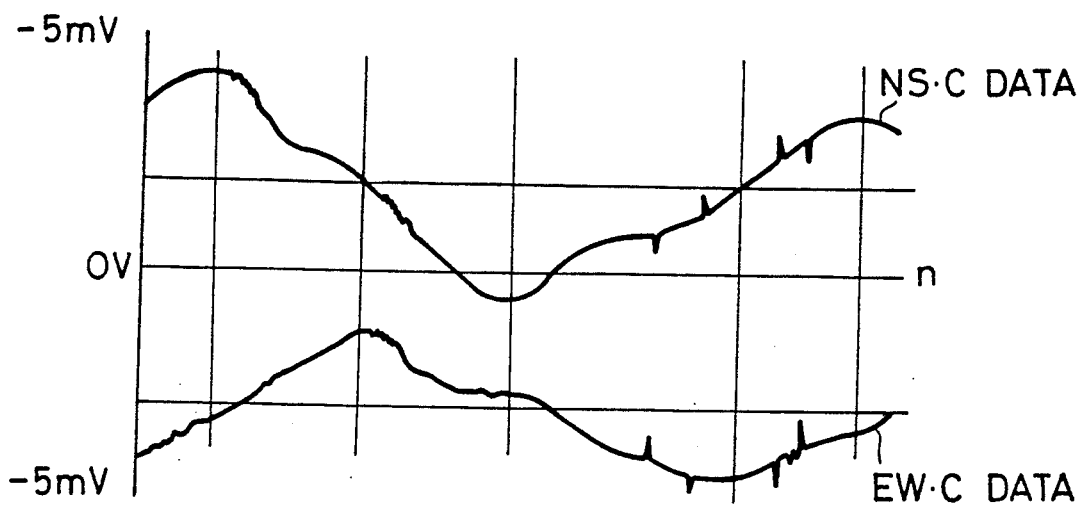
FIG. 6 is a waveform diagram showing the variation of data in the embodiment of FIG. 4.

The processor 8 executes various processes according to computer programs When a correction value setting subroutine shown in FIG. 5 is read out, a process for setting a correction value is started. In step SP1, (FIG. 5a) various variables set in registers and a memory are cleared and initialized. Then, in step SP2, a message "Rotate a sensor clockwise one revolution in 10 sec." is displayed, for example, on the display unit 12. An operator rotates the sensor FGS according to this display. In step SP3, output data of the coils NS.C and EW.C (data digitized by the A/D converter 6, which is hereinafter referred to as "NS data or EW data") are fetched. Thereafter, in step SP4, whether a variable n becomes "2000" or not or whether the content of a register T becomes "10" or not is judged. Here, the variable n is that value cleared in the step SP1. The register T acts as a clock for use in recording a signal input elapse time from a sensor, and the value in register T corresponds to a time (in seconds) from the start of processing of the subroutine shown in FIG. 5. When this judgment is "NO", the process advances to step SP5. In the step SP5, "1" is added to the variable n, and the process again returns to the step SP3. Thereafter, a loop of the steps SP3, SP4, SP5 to SP3 is circulated until the judgment of the step SP4 becomes "YES". Data as shown in FIG. 6(a) is sampled by fetching the data in the step SP3 during the circulating process. In this case, the data to be fetched is in a one-to-one relation to the value of the variable n. Thereafter, the data are identified by the value of the variable n for use. NS.C data is shown in the upper portions in FIGS. 6(a) and 6(c) and EW.C data is shown in the lower portions in FIGS. 6(b) and 6(d). As shown in FIG. 6(a), both kinds of data are generally superposed with noise components.

When T="10" or n="2000" is obtained, the judgment of the step SP4 becomes "YES". When the judgment of the step SP4 becomes "YES", the process advances to step SP6 to execute a smoothing process. The smoothing process removes any noise component superposed on the fetched data by averaging 5 continuous data points in which the values of the variable n become respectively k, (k+1), (k+2), ..., (k+2) and using the average value as the data point for n=(k+2).

The smoothing process thus removes noise overlapping an output signal from a sensor. The smoothing process includes these steps:

1. Output signals from the sensor are stored in a memory at equal time intervals.
2. A mean value of five continuous signals so recorded is calculated, and then the calculated value is stored in a new memory location.
3. A number of signals stored in the memory is incremented by one and the processing in step 2 above is carried out again.
4. The processing in step 3 above is carried out for all the signals stored in the memory.

Figure 7:
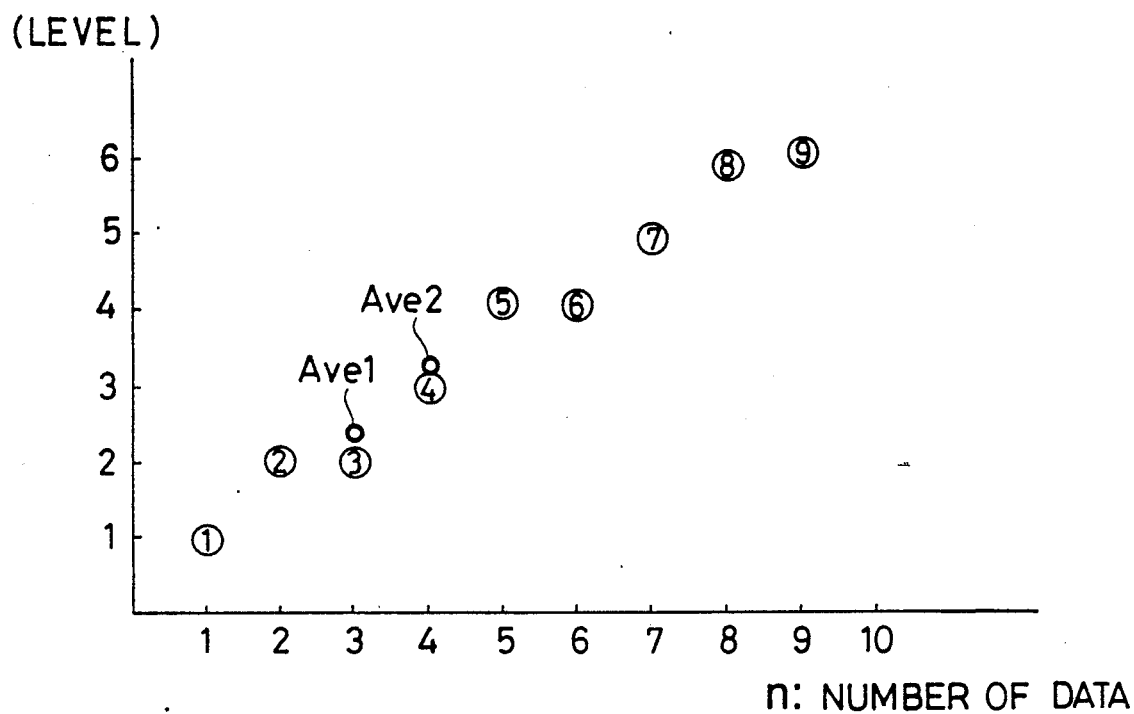
FIG. 7 is a view for explaining a smoothing process in the embodiment of FIG. 4.

The above-described process will be described by a simplified example. FIG. 7 illustrates the example. A memory number for an output signal from a sensor is stored in memory at an equal time interval and is designated by n (number of data points) and then an intensity of an output signal from the sensor is denoted by a level value. So, an actual output signal from the sensor is indicated as 1, 2, ..., 9 in FIG. 7.

In this figure, an initial averaging process is carried from the output signal 1 from the sensor to 5. That is, an averaging between the two data points across the data number of n=3 (five data bits in total) is carried out.

If it is assumed that this mean value is Ave 1, a mean value of the sensor output signals 1 to 5 can be calculated by the equation Ave 1=(1+2+3+4+5)/ 5.

In this case, a level of the sensor input signal 1 is 1 and similarly, a level of 2 is 2, a level of 3 is 2, a level of 4 is 3 and a level of 5 is 4. Then an actual value of Ave 1 is Ave 1=(1+2+2+3+4)/5=2.4.

Similarly, when Ave 2 is calculated, the two data points across the data number n=4 (five data points in total) are calculated resulting in Ave 2=(2+3+4+5+6)/5.

In this case, a level of the sensor output signal 2 is 2 and similarly, a level of 3 is 2, a level of 4 is 3, the levels of 5 and 6 are 4. An actual mean value of Ave 2 can be calculated as Ave 2=(2+2+3+4+4)/5=3.

Figure 6B:
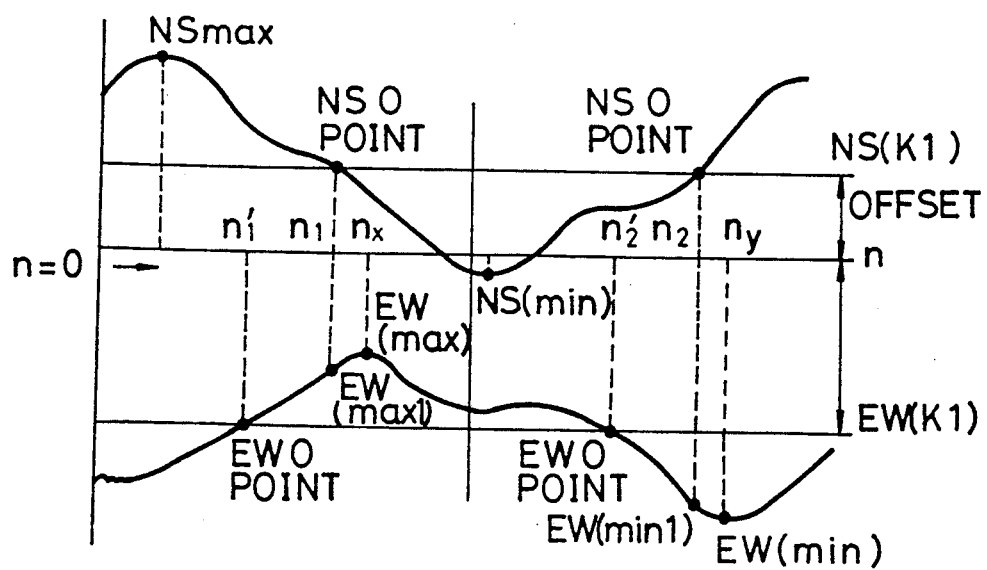

Thereafter, the above-mentioned process is sequentially repeated. This is the smoothing process. After this process is finished, the NS.C and EW.C data become smooth waveforms from which noise components are removed as shown in FIG. 6(b).

Then, the process advances to step SP7, and the maximum value and the minimum value of the data are detected. In step SP7, the data are processed from n=2 to n=1998 by the loop process of steps SP8 and SP 9, and the maximum values and the minimum values of the NS.C and EW.C data, and variable n for the values are obtained. The value 1998 is used because two data points are averaged. Thus since the maximum value is n=2000, n−2=1998. The values thus obtained are NS(max), NS(min), EW(max), EW(min) as shown in FIG. 6(b).

Then, the process advances to step SP10 to offset the data. First, calculations by the following equations are executed to calculate as offset values NS(K1) and EW(K1).

$$(NS(max)+NS(min)/2=NS(K1)$$

$$(EW(max)+EW(min))/2=EW(K1)$$

These offset values are the central values of the amplitudes of the data, and the relationship to the waveform after smoothing is shown in FIG. 6(b). When this process is ended, the process advances to step SP11 (FIG. 5(b)) and the value n for which the data value coincides with the offset value NS(K1) and EW(K1) is obtained. This process is executed from n=2 to n=1998 by the loop process in the steps SP12 and SP13. Here, the obtained values of n are designated by n1, n2, n3 as to the NS.C data, and n1', n2', n3' as to the EW.C data (FIG. 6(b)). The process advances to step SP14. In step SP14, whether the number of n (the number of points) coincident to the offset value is 3 or more is judged. If it is 3 or more, the process advances to step SP15 to display an error. This means that, when the number of n coincident to the offset value is 3 or more, the flux gate sensor FGS rotates to obtain more than one revolution. When the process for setting a correction value is executed in this case, an erroneous correction value is set. After the error is displayed in the step SP15, the process returns to a main routine. When the subroutine shown in FIG. 5(a) is again read out, the process for setting a correction value is repeated from the initial step (i.e., "START").

On the other hand, when the judgment of step SP14 is "NO", the process advances to step SP16, and the values of EW.X data at n1, n2 are obtained. A positive value of EW.C data at n1, n2 (positive with respect to the offset value EW(K1)) is EW(max1), and a negative value thereof (negative with respect to the offset value EW(K1)) is EW(min1) (FIG. 6(b)). Then, the process advances to step SP17, and whether the value nx of n at EW(max) is larger than the value n1 or n2 or not is judged. Variable nx refers to a location in the memory where a sensor output signal is stored; the memory location having the maximum value at EW is called "nx". Since the NS.C data and the EW.C data originally have a relationship between sine and cosine, nx=n1 and ny=n2 must be obtained. For example, if there is an error in the degree of perpendicularity between the coils EW.C and NS.C, the measured values do not coincide. In case of n1 being smaller than nx or n2 being smaller than ny, the NS.C data is delayed in phase from the correct phase. In the reverse case, the NS.C data is advanced in phase. In the case shown in FIG. 6(b), n1 is smaller than nx, and the EW.C data is delayed in phase.

The EW.C data is compared with n1 and n2 because there are the cases in which n1 is smaller than ny (or n1 larger than nx) and in which n2 is smaller than ny (or n2 larger than nx) according to the rotation starting position of the flux gate sensor FGS.

If this judgment is "NO", the process advances to step SP19, in which a calculation for calculating a correction value for correcting the advanced phase is executed. In case of "YES", the process advances to step SP18, in which a calculation for calculating a correction value for correcting the delayed phase is executed. The calculation is executed as below.

Figure 6C:
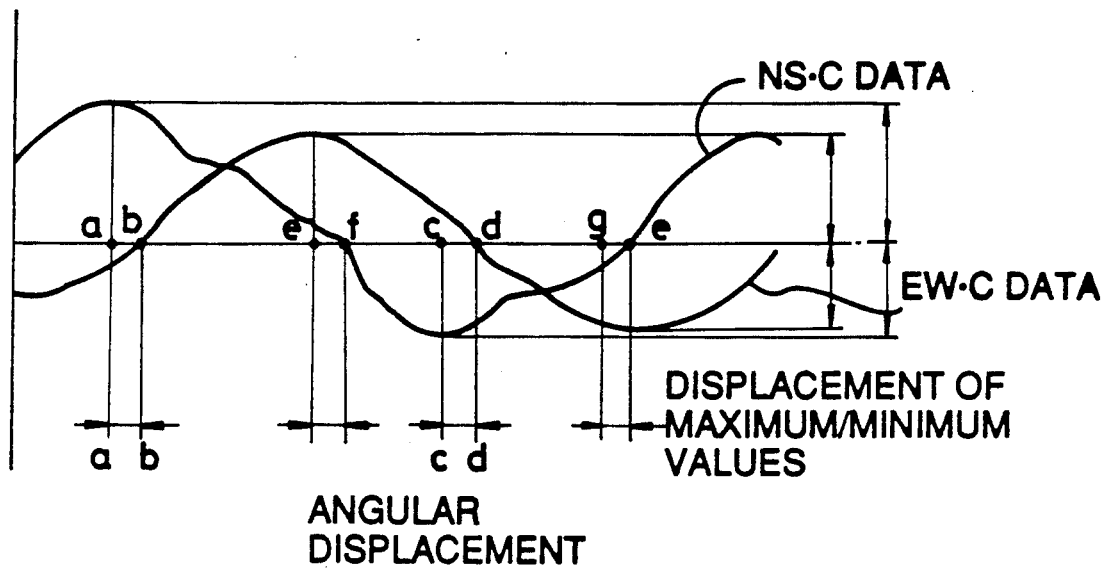

In step SP18, the following equations are first executed.

$$\theta_L = \frac{\cos^{-1}(EW(max)/A)}{\cos^{-1}(EW(max)A)}$$

$$\theta_S = \frac{\cos^{-1}(EW(min)/A)}{\cos^{-1}(EW(min)/A)}$$

$$\theta_E = \frac{\theta_L + \theta_S}{2}$$

where the meanings of $\theta_L$ and $\theta_S$ will be described below. FIG. 6(c) is a view showing that the waveforms of NS.C and EW.C data are superposed by bringing the offset values NS(K1) and EW(K1) in coincidence. In FIG. 6(c), the ratio of the angular displacements of the points a to b is $\theta_L$, the ratio of the angular displacements of the points c to d is $\theta_L$, and the ratio of the angular displacements of negative sides is $\theta_S$. And, the average value of the angular displacement ratios is $\theta_E$.

Further, the calculations according to the following equations are executed in step SP19.

$$\theta_L = \frac{\cos^{-1}(EW(max1)/A)}{\cos^{-1}(EW(max)A)}$$

$$\theta_S = \frac{\cos^{-1}(EW(min1)/A)}{\cos^{-1}(EW(min)/A)}$$

$$\theta_E = \frac{\theta_L + \theta_S}{2}$$

The calculations of $\theta_L$ and $\theta_S$ in the step SP19 are executed by replacing the denominator of the calculation in the step SP18 by the numerator. This is because the one calculation calculates the correction value of the advanced phase, while the other calculates the correction value of the delayed phase. The value A in the steps SP18 and SP19 is a preset reference value, being a value larger than the maximum value of the NS.C and EW.C data. The $\theta_E$ calculated by the respective calculations is used in the operation of measuring an azimuth to be performed after the subroutine for setting the correction value in FIGS. 5(a) and 5(b).

In the steps SP18 and SP19, the angle correction value $\theta_E$ of EW was obtained by the NS reference. However, the accuracy of the angle correction can be raised further by similarly obtaining the NS angle correction value with the EW reference.

Then, a level correction value is obtained by the following equations in step SP20.

$$A/(NSmax) = NS(K2)$$

$$A/(NSmin) = NS(K3)$$

$$A/(EWmax) = EW(K2)$$

$$A/(EWmin) = EW(K3)$$

where NS(K2) and NS(K3) are level correction values for NS.C data. In the azimuth measuring process to be described later, NS(K2) is multiplied by the positive side of the data, and NS(K3) is multiplied by the negative side of the data. In this manner, the NS.C data is converted to data which varies in a range of ±A.

Figure 6D:
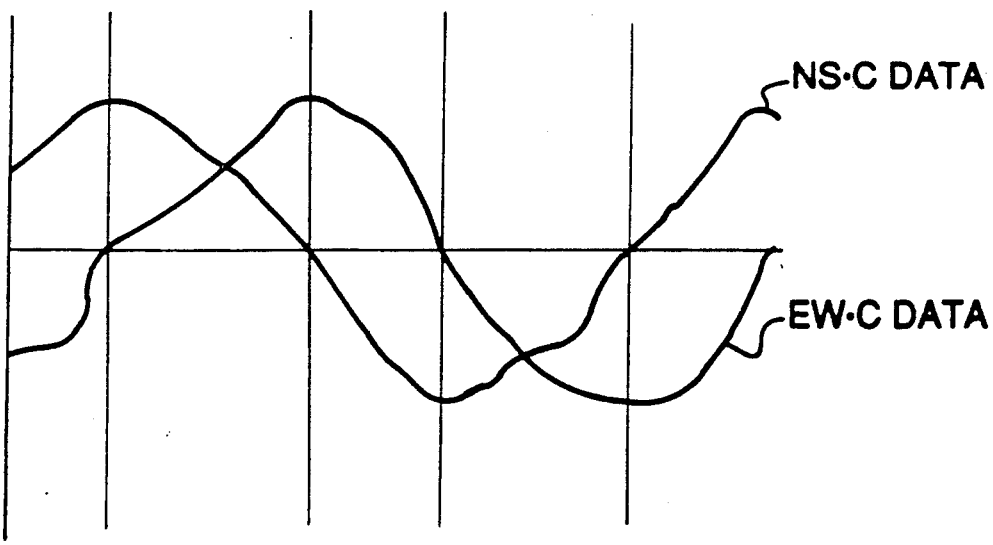

EW(K2) and EW(K3) are, similarly to the above, level correction values for EW.C data. In the azimuth measuring process to be described later, EW(K2) is multiplied by the positive side of the data, and EW(K3) is multiplied by the negative side of the data. Thus, the EW.C data is converted to data which varies in a range of ±A. The angular displacement correction, and the displacements of the maximum and minimum values are compensated by the process in the steps SP18, SP19 and SP20 described above. As shown in FIG. 6(d), in the waveforms after the correction, the maximum and minimum values of the NS.C and EW.C data coincide, and the phase relationship becomes an accurate 90° difference (between sine and cosine). Then, the process advances to step SP21, and the correction values obtained in the above-described steps, i.e., $\theta_E$, EW(K1), EW(K2), NS(K1), NS(K2) are stored in predetermined areas of the memory. Then, the process returns to a main routine.

The operation of measuring an azimuth will now be described. NS.C data outputted from the A/D converter 6 is first fetched, and the value NS(K1) and NS(K2) is multiplied by the NS.C data according to its symbol. The designation of the data after this multiplication is NS. Similarly, the EW.C data is multiplied by EW(K1) and EW(K2). The designation of the data after this multiplication is EW.

If the azimuth $\theta$ to be obtained is disposed in a first quadrant as determined from the relationship of the symbols of the NS.C and EW.C data, the azimuth $\theta$ is individually obtained by the equations (1) and (2) described above with the NS and EW data. Here, $\theta$ obtained by the NS data is the value NS($\theta$), and $\theta$ obtained by the EW data is the value EW($\theta$). In this case, if the angle is displaced, the abovementioned angle displacement correction value $\theta_E$ is added to or subtracted from the value EW($\theta$) to correct the angle displacement. Here, the process will be described without angle displacement for simplicity.

Figure 8:
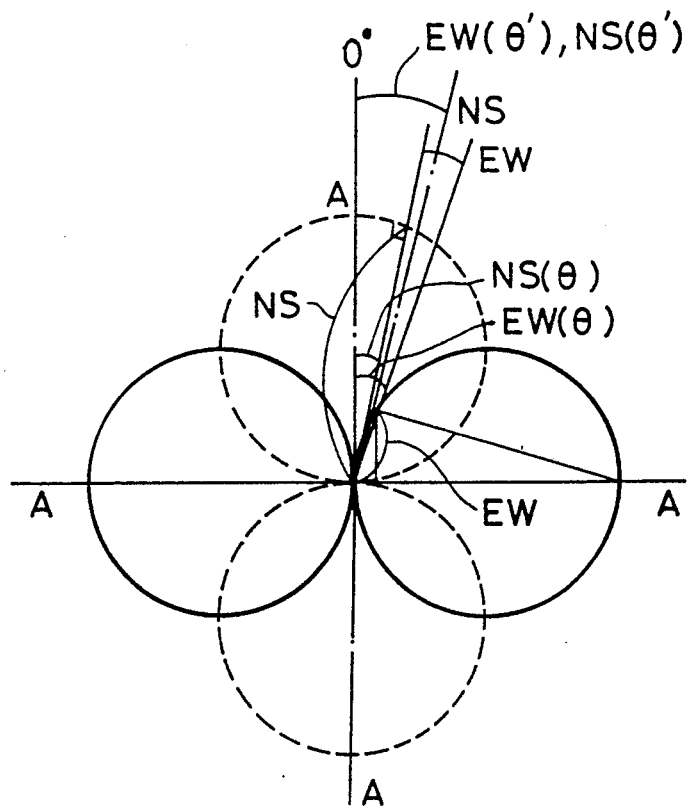
FIG. 8 is a waveform diagram for explaining a weighting process in the embodiment of FIG. 4.

For example, as shown in FIG. 8, assume that the azimuth $\theta$ is disposed in the first quadrant, the NS data value is 0.866, and the EW data value is 0.574. If the reference value A is set to "1", NS($\theta$) becomes 30° and EW($\theta$) becomes 35° as determined by the equations (1) and (2). In this manner, the values of $\theta$ are different because of the influences of various noise sources and earth magnetism as well as the inclination of the flux gate sensor. If the values of $\theta$ are coincident, this value of $\theta$ can be employed as the azimuth $\theta$. If the values are different, the value compensated by weighting the values as described below is used as the azimuth $\theta$.

The weighting process will now be described. If the azimuths $\theta$ are equal, the following equation is obtained by the relationship of the trigonometric function.

$$(NS)^2 + (EW)^2 = 1$$

Accordingly, the following equations are obtained.

$$(NS)2 = 1-(EW)2$$

$$(EW)2 = 1-(NS)2$$

According to the above-mentioned example, EW=0.574, and the following values are obtained by the above equations.

$$\begin{aligned}(NS)^2 &= 1 - 0.574^2 \\ &= 0.67 \\ (EW)^2 &= 1 - 0.67 \\ &= 0.33\end{aligned}$$

Then, the difference between NS($\theta$) and EW($\theta$) is obtained as x($\theta$). When this difference is calculated, the value x($\theta$) is as below.

$$x(\theta) = 30° - 35°$$

The angles after weighting are NS($\theta'$) and EW($\theta'$), which are obtained by these equations as follows.

$$\begin{aligned}NS(\theta') &= NS(\theta) - x(\theta) \times (EW)^2 \\ &= 30 + 5 \times 0.33 \\ &= 31.65° \\ EW(\theta') &= EW(\theta) + x(\theta) \times (NS)^2 \\ &= 35 - 5 \times 0.67 \\ &= 31.65°\end{aligned}$$

When the resolution of the angle is 1°, the measured azimuth is displayed as 32°.

If EW($\theta$) and NS($\theta$) are largely separated, the processor 8 judges an error, and displays the error on the display unit 12. The cause for generating this error is the inclination of the flux gate sensor FGS, etc.

According to the embodiments of the present invention as described above, there is provided a method of measuring an azimuth for detecting earth magnetism by using two perpendicular coils to detect the azimuth according to the outputs of the coils, comprising the steps of converting the outputs of the coils by multiplying them by a constant which varies in a range of a reference value, dividing the converted signal by the reference value, and measuring the azimuth at each coil output according to an inverse trigonometric function with the divided result as a variable, and there is also provided an azimuth measuring apparatus comprising means for executing the above method. Therefore, the azimuth detection is obtained by two routes, which are compared to correct the error and to compensate the azimuth value. Consequently, an azimuth measurement of higher reliability can be provided.

According to one embodiment of the present invention as described above, there is also provided a method of measuring an azimuth, wherein, when the azimuths obtained according to the outputs of the coils are different, the angular difference is multiplied by the square of the output value of the other coil, the multiplied value is subtracted from or added to the azimuth obtained by the output of one coil, and the result is weighted as a true azimuth value. Accordingly, even if there is a disorder of the earth magnetism, the influence is not affected, and an accurate azimuth measurement can be performed.

According to one embodiment of the present invention, there is also provided a method of measuring an azimuth, wherein whether the phase relationship of the outputs of the coils is normal or not is judged, and the correction of the angle corresponding to the displacement of the phase angle is executed for the output of one coil when the phase relationship is not normal. Accordingly, even when there is an error in the degree of perpendicularity of the two coils, the error can be removed through the described correction method.

What is claimed is:

1. A method for measuring an azimuth relative to the earth's magnetic field, comprising the steps of:
   providing two coils perpendicular to each other;
   measuring an output signal from each of said coils;
   multiplying the output signal of each of said coils by a constant to provide a converted signal having a value within a predetermined range;
   dividing the converted signal by a predetermined value to provide a normalized signal value;
   computing a smaller value for the azimuth using said normalized signal value from one of said coils and computing a larger value for azimuth from said normalized signal value from the other one of said coils by substituting each said value into an inverse trigonometric function; and
   adding to the smaller one of said azimuth values a product equal to a difference of said smaller and larger values of azimuth multiplied by a factor proportional to a ratio of the output signals of the two coils.

2. A method for determining an azimuth as in claim 1 which further includes the steps of:
   rotating both of said coils to generate a periodic function of the output signal versus rotation for each coil wherein each periodic function has a particular phase;
   comparing a displacement angle between said phases to a particular value; and
   correcting said phase of one function by an angle corresponding to said displacement angle.

3. An azimuth measuring apparatus comprising:
   two perpendicular coils each emitting a signal proportional to components of the earth's magnetic field;
   means for rotating said coils;
   means for multiplying a constant by each of the outputs of said coils, thereby converting the multiplied value to a value within a range of a reference value;
   means for dividing said multiplied value by said reference value to provide an output value;
   means for computing a value of azimuth for every output of each of the coils as said coils are rotated as an inverse trigonometric function of said output value;
   means for storing signals as said coils are rotated, thereby producing a first and a second periodic signal function, one for each coil, said functions having respectively first and second phases;
   means for computing a phase difference between said phases;
   means for comparing said phase difference to a predetermined value; and
   means for displacing said first phase toward said second phase when said phase difference exceeds said predetermined value.

* * * * *